Patented Nov. 14, 1939

2,180,095

UNITED STATES PATENT OFFICE 2,180,095

VALUABLE DEGRADATION PRODUCTS OF STEROLS AND A METHOD OF PRODUCING THE SAME

Lothar Strassberger, Berlin-Wilmersdorf, and Helmut Jacobi, Berlin-Charlottenburg, Germany, assignors to Schering Corporation, Bloomfield, N. J., a corporation of New Jersey No Drawing. Application March 9, 1936, Serial No. 67,908. In Germany March 9, 1935

23 Claims. (Cl. 260—397)

This invention relates to valuable degradation products of sterols and more particularly to polycyclic hydroxy acids and their derivatives present in the acid fraction of the reaction mixtures obtained by subjecting sterols containing at least one double bond in their cyclopentano polyhydro phenanthrene ring system, to the action of oxidizing agents capable of splitting up carbon to carbon bonds, such as chromic acid anhydride and the like.

The acid fraction of said reaction mixtures contains the 3-hydroxy cholenic acid and/or its lower homologue acids or the derivatives of the same. Said compounds correspond to the general formula $C_{19}H_{28}XR$ and the structural formula

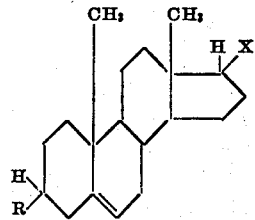

wherein X represents either a $$CH(CH_3).CH_2.CH_2.COOH$$

group or a $CH(CH_3).CH_2.COOH$ group or a $CH(CH_3).COOH$ group and R either a hydroxy group or a group that, upon hydrolysis, is reconvertible into an OH-group, for instance, an O-acyl, O-alkyl, O-aryl group, halogen or the like.

One object of the present invention consists in that from the acid fraction of the reaction mixtures obtained by subjecting cholesterol or a material containing cholesterol to the action of oxidizing agents as stated above, 3-hydroxy cholenic acid or its derivatives are isolated having the general formula $C_{19}H_{28}R.CH(CH_3).CH_2.CH_2.COOH$ and the structural formula

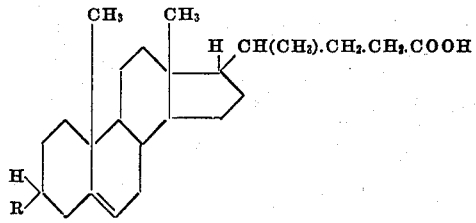

wherein R represents either a hydroxy group or a group that, upon hydrolysis, is reconvertible into an OH-group, for instance, an O-acyl, O-alkyl, O-aryl group, halogen or the like.

Another object of the present invention consists in that from the acid fraction of the reaction mixtures obtained by subjecting sitosterol or a material containing sitosterol to the action of oxidizing agents as stated above, 3-hydroxy norchloenic acid or its derivatives are isolated having the general formula $C_{19}H_{28}R.CH(CH_3).CH_2.COOH$ and the structural formula

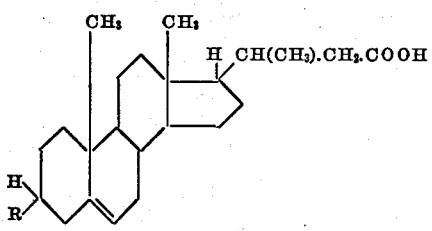

wherein R represents either a hydroxy group or a group that, upon hydrolysis, is reconvertible into an OH-group, for instance, an O-acyl, O-alkyl, O-aryl group, halogen or the like.

A further object of the present invention consists in that from the acid fraction of the reaction mixtures obtained by subjecting stigmasterol or a material containing stigmasterol to the action of oxidizing agents as stated above, 3-hydroxy bisnorcholenic acid or its derivatives are isolated having the general formula $$C_{19}H_{28}R.CH(CH_3).COOH$$

and the structural formula

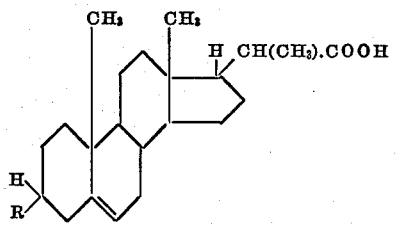

wherein R represents either a hydroxy group or a group that, upon hydrolysis, is reconvertible into an OH-group, for instance, an O-acyl, O-alkyl, O-aryl group, halogen or the like.

A still further object of the present invention consists in that from the acid fraction of the reaction mixtures obtained by subjecting mixtures of sterols, such as, for instance, phytosterol or a material containing phytosterol, to the action of oxidizing agents as stated above, a mixture of two or three of the above mentioned 3-hydroxy acids or their derivatives is isolated which mixture may then be separated into its constituents.

Other objects of this invention will be evident from the following description and claims annexed hereto.

The acid fraction of said oxidation mixtures of sterols contains other acids besides the cholenic acid and/or its lower homologues. The separation of these cholenic acids from the other acid constituents of the mixture may be carried out in any desired manner; especially valuable have proved the following methods.

The oxidation mixture obtained on oxidizing sterols is extracted, for instance, with ether or another suitable organic solvent, the ethereal extract is shaken with alkaline agents, such as alkali hydroxide. Thereby the acid fraction is separated from the neutral fraction of said oxidation mixture, the neutral fraction remaining in the organic solvent, while the acid fraction is transformed into the alkali salts of the corresponding acids. Generally when choosing proper reaction conditions the alkali salts of the cholenic acid and/or its lower homologues are precipitated and can thus be separated, for instance, by filtration from the ethereal extract of the neutral constitutents as well as from the solution of the alkali salts of the other acids formed on oxidizing sterols. In principle, this method of separating the acid constitutents into a fraction consisting of cholenic acid and/or its lower homologues and a fraction consisting of the other acid constituents of the oxidation mixture is based upon the different solubility of suitable salts of the various acids formed on oxidizing sterols.

Another method of separating the cholenic acid and/or its lower homologues from the other acid constituents of the oxidation mixture consists in subjecting the entire acid fraction as separated from the neutral fraction of the oxidation mixture, to fractional recrystallization from suitable solvents.

A further method of isolating cholenic acid and/or its lower homologues from the acid fraction of the oxidation mixture consists in fractional distillation or sublimation of the entire acid fraction, preferably in a high vacuum. Of course, in this case it is advisable first to heat the acid fraction to a suitable temperature in order to split off carbonic acid from the polycarboxylic acids present in the acid fraction because otherwise the carbonic acid would diminish the vacuum so that proper fractional distillation or sublimation is impeded.

A still further method of isolating the cholenic acid and/or its lower homologues from the other acid constituents of the oxidation mixture consists in transforming said acid fraction in a known manner into esters, for instance, by means of diazo-methane and the like, and subjecting said esters to fractional and/or repeated recrystallization or to distillation, sublimation and the like, preferably in a high vacuum.

Other methods of isolating the cholenic acid and/or its lower homologues from the reaction mixture obtained on oxidizing sterols as they are known to those skilled in the art, may likewise be employed.

In general, in the oxidation of the unsaturated sterols the double bond is protected from the action of the oxidizing agents by the addition of halogen or halogen halide. Hence, in order to produce the cholenic acid and/or its lower homologues it is necessary to reestablish the double bond in the molecule of said acids. This may be done either before separating the acid constituents from the neutral portion, i. e., by subjecting the entire oxidation mixture to a dehalogenating treatment, or one may first separate the halogenated acid constituents from the neutral portion and then reestablish the double bond in the whole acid fraction. In some cases one may even effect the reestablishment of the double bond after having separated and isolated the cholenic acid and/or its lower homologues from the other acid constituents of the acid fraction. Said reestablishment of the double bond may be carried out in any known manner, such as, for instance, by treating with zinc dust or sodium amalgam, metallic nickel or the like, or in case the double bond is protected by addition of halogen hydride, by treatment with alkaline agents, such as potassium hydroxide, pyridine and the like, methods as they are described, for instance, in Houben-Weyl, Methoden der organischen Chemie, volume 3, 2nd edition, 1923, page 909 and following.

Of course, when separating cholenic acid and/or its lower homologues from the other acid constituents by distillation or sublimation of the acid fraction itself or of the ester mixture of said acid fraction it is always advisable first to reestablish the double bond in the molecule of said acid fraction; otherwise the yield in these methods of separation and isloation will be considerably decreased.

When in the oxidation of the unsaturated sterols the hydroxy group has been protected from the action of the oxidizing agents by conversion into a group that, upon hydrolysis, is reconvertible into the hydroxy group, such as, for instance, by esterification, etherification and the like, the hydroxy group in the molecule of the acid constituents may be reestablished in any desired stage of the separating and isolating process of the present invention.

When using in the oxidation process a mixture of sterols as starting material, such as phytosterol that consists of a mixture of stigmasterol and sitosterol, not only cholenic acid or one of its lower homologues is obtained but mixtures of the same, for instance, in the case of phytosterol, mixtures of norcholenic acid and bisnorcholenic acid. The separation of these mixtures and the isolation of the various components therefrom may be carried out in any desired manner. A very convenient method of separating the various cholenic acids from each other consists in making use of the different solubility of their alkaline earth metal salts, especially their barium salts in alcoholic solution. Thus, the cholenic acid and the norcholenic acid form relatively difficultly soluble alkaline earth salts while the alkaline earth salts of the bisnorcholenic acid are relatively readily soluble.

When using phytosterol as starting material this separating process may be carried out in the following manner:

The difficultly soluble sodium salts of the acid fraction of the oxidation mixture as they are obtained, for instance, on shaking an ethereal extract of the oxidation mixture with sodium hydroxide solution, are transformed into the free acids. Thereupon said acids are dissolved in an alcoholic solvent, such as methanol. To this solution there is then added an alcoholic alkaline earth hydroxide solution, preferably an alcoholic barium hydroxide solution. Thereby the difficultly soluble barium salt of the norcholenic acid is precipitated while the barium salt of the bisnorcholenic acid remains in the alcoholic solution.

The cholenic acid may similarly be separated from the bisnorcholenic acid by taking advantage of the fact that the alkaline earth metal salts of the former is difficultly soluble in alcoholic solvents.

The process of the present invention may be illustrated by the following examples without, however, limiting the same to them.

Example 1

The mixture obtained by oxidizing cholesterol acetate dibromide with chromic acid is poured into water, extracted with ether and the ethereal solution shaken with 2 N aqueous sodium hydroxide solution. Thereupon the precipitate formed thereby is filtered off and suspended in ether. After acidifying the ethereal suspension with dilute sulfuric acid, the ethereal solution is separated from the aqueous acid and evaporated to dryness. The residue is dissolved in glacial acetic acid and debrominated by the addition of zinc dust and heating the reaction mixture for about one hour on a water bath while stirring thoroughly. After removal of the excess of zinc dust the solution is evaporated to dryness in a vacuum and the residue is triturated with methanol. Upon allowing the methanolic extract to stand for 24 hours in a refrigerator at $-8°$ C., the 3-acetoxy cholenic acid crystallises. The crystalline mass is filtered off and washed with well cooled methanol. In this manner from 12 grams of the acid fraction of the oxidation mixture there are obtained about 1.6 grams of a crude product commencing to melt at 150° C. and melting completely at 160–164° C. On repeated recrystallisation from methanol white crystals having a melting point of 183–184° C. are obtained. On saponification the acetate is transformed into the 3-hydroxy cholenic acid of the melting point of about 232° C.

Example 2

The oxidation mixture obtained by oxidizing sitosterol acetate dibromide with chromic acid, is poured into water and worked up in the same manner as described in Example 1. After debromination the reaction mixture is poured into water and extracted with ether. The ethereal solution is evaporated to dryness and the residue is dissolved in hot acetone. On cooling the 3-acetoxy norcholenic acid is obtained. By saponification the free 3-hydroxy norcholenic acid of the melting point 240–242° C. is formed.

Example 3

The oxidation mixture obtained by oxidizing stigmasterol acetate dibromide with chromic acid is debrominated by means of zinc dust in glacial acetic acid solution. Thereupon the reaction mixture is filtered and the filtrate extracted with ether. The ethereal solution is shaken with 2 N potassium hydroxide solution, the precipitate formed thereby is filtered off and suspended in ether. The ethereal solution is acidified with dilute sulfuric acid, washed with water and evaporated to dryness. The residue is saponified by means of a 5% methanolic potassium hydroxide solution. The saponification mixture is acidified, extracted with ether and the etheral solution evaporated to dryness. The residue on recrystallisation from methanol yields 3-hydroxy bisnorcholenic acid of melting point of about 295–302° C.

Example 4

Phytosterol acetate having the ring double bond protected by the addition of bromine, is oxidized in glacial acetic acid solution by means of chromic acid. The reaction mixture is then debrominated by means of zinc dust, filtered from the excess of zinc dust and poured into water; the aqueous solution is then extracted with ether and the ethereal solution shaken with 2 N aqueous sodium hydroxide solution. The precipitate formed thereby is filtered off, suspended in ether and the ethereal suspension is acidified with sulfuric acid. The ethereal solution is evaporated to dryness, whereafter the residue is saponified by means of methanolic potassium hydroxide solution. After acidifying the saponification mixture and extracting the same with ether the ethereal solution is evaporated to dryness. The residue is dissolved in hot methanol and to this solution a hot methanolic solution of barium hydroxide is added. After cooling the reaction mixture to room temperature, the precipitate is filtered off, suspended in ether and acidified with hydrochloric acid, whereafter the ethereal solution is evaporated to dryness; the residue on recrystallisation from methanol yields 3-hydroxy norcholenic acid of the melting point 240–242° C.

The filtrate of the precipitate formed by adding the methanolic barium hydroxide solution, is poured into water, acidified with hydrochloric acid and extracted with ether. The ethereal solution is washed with water and evaporated to dryness. The residue is recrystallised from glacial acetic acid whereby the free 3-hydroxy bisnorcholenic acid of the melting point 295–302° C. is obtained.

Example 5

The oxidation mixture obtained by oxidizing cholesterol acetate dibromide by means of chromic acid is dehalogenated by means of zinc dust and worked up in the same manner as described in Example 4. The precipitate formed on the addition of a hot methanolic barium hydroxide solution is filtered off, suspended in ether and acidified with hydrochloric acid. The acid solution is diluted with water and extracted with ether, the ethereal solution is washed with water and evaporated to dryness. The residue is treated with an excess of diazo-methane in alcoholic solution; after allowing the solution to stand over night the alcohol is distilled off in a vacuum. Acetic acid anhydride is added to the residue and the acetylation mixture is heated in an oil bath for several hours at 150° C. Thereupon the reaction mixture is poured into water, extracted with ether, the ethereal solution is washed with sodium bicarbonate solution and water and evaporated to dryness. The mixture of the esters is distilled in a high vacuum at 0.002 mm. pressure and the fraction distilling between 190–200° C. is collected. It is dissolved in hot methanol. On cooling a difficulty soluble ester crystallises having a melting point of 154–155° C. thus, representing the 3-acetoxy cholenic acid methyl ester.

From the mother liquor a readily soluble methyl ester can be isolated having a melting point of 125–127° C. and representing the 3-acetoxy norcholenic acid methyl ester, that on saponification yields an acid of the melting point 240–242° C.

Example 6

100 grams of the acid constituents obtained in the oxidation of cholesterol acetate dibromide with chromic acid are dissolved for the purpose of debromination in 1,500 ccs. of glacial acid and the solution stirred with 200 grams of zinc dust for one hour at about 100° C. The whole is poured into 5 litres of water, the separated acids taken up in ether and the ether repeatedly washed with water. The ether is evaporated and the residue dissolved in 200 ccs. of hot acetone. On cooling the 3-acetoxy cholenic acid crystallises out, which after recrystallisation melts at 183–184° C. On gradually diluting the mother liquor of the 3-acetoxy cholenic acid with 50 ccs. of 50% acetic acid a precipitate melting at about 120° C. is obtained. Therefrom an acid can be isolated that corresponds in its properties to 3-acetoxy norcholenic acid.

Example 7

The oxidation mixture obtained on oxidizing cholesterol with chromic acid in glacial acetic acid solution is treated with zinc dust for about half an hour on the boiling water bath. After filtering the excess of zinc dust most of the glacial acetic acid is distilled off in a vacuum. Thereupon the residue is shaken thoroughly with ether and water. The aqueous layer is removed, again repeatedly extracted with ether and the combined ethereal solutions are washed with water until the ether is almost colorless. Thereupon the ether is shaken with a 2 N potassium hydroxide solution until the reaction of the solution is alkaline. Thereby the insoluble potassium salt is precipitated and removed by centrifuging, and washed twice with 2 N potassium hydroxide solution on the centrifuge. Thereupon the salt is suspended in ether and decomposed by means of dilute sulfuric acid. On extraction with ether and evaporation of the ethereal solution the 3-acetoxy cholenic acid is obtained in impure form. In order to free said acid from the impurities an ethereal solution of the same is treated with an excess of ethereal diazo-methane solution. The reaction is accelerated by the addition of a small amount of methanol whereby vivid gas development takes place. After evaporating the ether, the residue is fractionated by distillation in a high vacuum; thereby a fraction is obtained representing the pure methyl ester of the 3-acetoxy cholenic acid. Therefrom by saponification the free 3-hydroxy cholenic acid is obtained.

Of course, instead of stigmasterol, cholesterol, sitosterol and phytosterol other sterols containing at least one double bond in their cyclopentano polyhydro phenanthrene ring system as, for instance, cinchol and the like, or mixtures of said sterols may be used as starting material for the oxidation process.

Instead of the 3-acetyl sterols the corresponding benzoyl, succinyl, phthalyl or other acyl compounds of sterols or the methyl, the ethyl and the like ethers of the sterols may be employed.

The oxidation itself may be carried out in any desired manner as described, for instance, in the copending application Serial No. 41,202. Thus the oxidation of the unsaturated sterols can be carried out with oxidizing agents which are capable of splitting single carbon to carbon bonds, for example, a suitable compound of hexavalent chromium, such as chromic acid anhydride or the like, permanganate compounds, etc., the nuclear double bond being preferably intermediately protected against the action of the oxidizing agent by the addition of removable groups, such as halogen or hydrogen halide.

Likewise the separation of the neutral oxidation products from the acid oxidation products as well as the dehalogenation of the oxidation products may be effected in any other suitable manner than that described in the preceding examples.

The acids obtained by the various separation and isolation processes may be further purified by fractional and/or repeated crystallisation, distillation, sublimation or by any other suitable method.

Instead of ether other water-immiscible solvents that are capable of dissolving the acids, such as, for instance, benzene, and other hydrocarbons, acetic acid ethyl ester and the like; instead of methanol or acetone, other water-miscible solvents, such as dioxane, ethyl alcohol and the like, may be employed for isolation, recrystallisation and/or purification purposes.

Furthermore the reaction conditions, the temperatures employed, the reaction duration, etc. may be varied and many other changes and modifications may be made by those skilled in the art in accordance with the principles set forth herein and the claims annexed hereto.

The progress achieved by the process of the present invention consists in the feature that by-products formed on oxidizing unsaturated sterols by means of oxidizing agents capable of splitting up carbon to carbon bonds, that have hitherto been considered valueless are worked up into valuable polycyclic hydroxy acids that up to now could only be obtained by complicated procedures, for instance, by subjecting valuable sterols to special degradation processes. Said polycyclic hydroxy acids are valuable intermediate compounds; for, they may be readily transformed, for instance, into compounds of high physiological activity, such as the male sex hormone, dehydroandrosterone, or the corpus luteum hormone, pregnendione, or the bile acids or the like.

What we claim is:

1. A method of producing unsaturated polycyclic hydroxy acid compounds of the general formula $C_{19}H_{28}XR$ and the structural formula

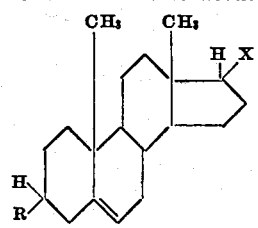

wherein X represents a radical belonging to the group consisting of $CH(CH_3).CH_2.CH_2.COOH$, $CH(CH_3).CH_2.COOH$ and $CH(CH_3).COOH$, and R represents a radical belonging to the group consisting of hydroxyl and groups which, upon hydrolysis, are replaced by a hydroxy group, comprising treating a reaction mixture obtained on subjecting sterols containing a double bond in their cyclopentano polyhydro phenanthrene ring system, to the action of oxidizing agents capable of splitting up single carbon to carbon bonds with an agent capable of separating out the acid fraction, and subjecting the separated acid fraction to an agent capable of isolating said unsaturated polycyclic hydroxy compounds present in said acid fraction.

2. A method of producing unsaturated polycyclic hydroxy acid compounds of the general formula $C_{19}H_{28}XR$ and the structural formula

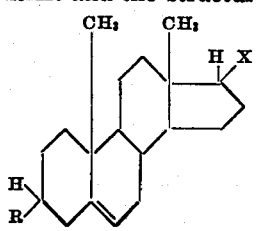

wherein X represents a radical belonging to the group consisting of CH(CH₃).CH₂.CH₂.COOH, CH(CH₃).CH₂.COOH and CH(CH₃).COOH, and R represents a radical belonging to the group consisting of hydroxyl and groups which, upon hydrolysis, are replaced by a hydroxy group, comprising dehalogenating the reaction mixture obtained by the action of oxidizing agents capable of splitting up single carbon to carbon bonds, on unsaturated sterols, the double bond present in the cyclopentano polyhydro phenanthrene system of said sterols being protected from the action of the oxidizing agent by the addition of a member of the group consisting of halogen and hydrogen halide, and treating the reaction mixture with an agent capable of separating out the acid fraction of the dehalogenated reaction mixture.

3. A method of producing unsaturated polycyclic hydroxy acid compounds of the general formula $C_{19}H_{28}XR$ and the structural formula

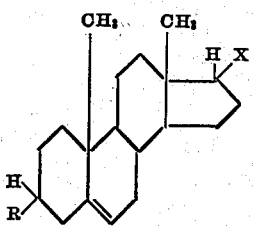

wherein X represents a radical belonging to the group, consisting of CH(CH₃).CH₂.CH₂.COOH CH(CH₃).CH₂.COOH and CH(CH₃).COOH, and R represents a radical belonging to the group consisting of hydroxyl and groups which, upon hydrolysis, are replaced by a hydroxy group, comprising treating the reaction mixture obtained by the action of oxidizing agents capable of splitting up single carbon to carbon bonds, on unsaturated sterols, the double bond present in the cyclopentano polyhydro phenanthrene system of said sterols being protected from the action of the oxidizing agent by the addition of a member of the group consisting of halogen and hydrogen halide, with an agent capable of separating out the acid fraction, and subjecting said acid fraction to a dehalogenating treatment.

4. A method according to claim 1, including the steps of treating the reaction mixture containing the acid fraction in aqueous solution with compounds capable of forming insoluble salts with said unsaturated polycyclic hydroxy acid compounds and separating out the insoluble salts formed thereby.

5. A method according to claim 1, including the steps of treating the reaction mixture containing the acid fraction in aqueous solution with an alkali metal base, and separating out the insoluble salts formed thereby.

6. A method according to claim 1, including the steps of treating the reaction mixture containing the acid fraction in aqueous solution with compounds capable of forming insoluble salts with said unsaturated polycyclic hydroxy acid, separating out the insoluble salts formed thereby, converting the salts of the acid fraction into the free acids, and subjecting the acids so obtained to recrystallization.

7. A method according to claim 1, including the steps of treating the reaction mixture containing the acid fraction in aqueous solution with compounds capable of forming insoluble salts with said unsaturated polycyclic hydroxy acid, separating out the insoluble salts formed thereby, converting the salts of the acid fraction into the free acids, and subjecting the acids so obtained to recrystallization from water-miscible organic solvents.

8. A method according to claim 1, including the steps of treating the reaction mixture containing the acid fraction in aqueous solution with compounds capable of forming insoluble salts with said unsaturated polycyclic hydroxy acid, separating out the insoluble salts formed thereby, converting the salts of the acid fraction into the free acids, and subjecting the acids so obtained to recrystallization from acetone.

9. A method according to claim 1, including the steps of treating the reaction mixture containing the acid fraction in aqueous solution with compounds capable of forming insoluble salts with said unsaturated polycyclic hydroxy acid, separating out the insoluble salts formed thereby, converting the salts of the acid fraction into the free acids, and subjecting the acids so obtained to fractional distillation.

10. A method according to claim 1, including the steps of treating the reaction mixture containing the acid fraction in aqueous solution with compounds capable of forming insoluble salts with said unsaturated polycyclic hydroxy acid, separating out the insoluble salts formed thereby, converting the salts of the acid fraction into the free acids, esterifying the acids so formed, and subjecting the esters obtained to fractional crystallization.

11. A method according to claim 1, including the steps of treating the reaction mixture containing the acid fraction in aqueous solution with compounds capable of forming insoluble salts with said unsaturated polycyclic hydroxy acid, separating out the insoluble salts formed thereby, converting the salts of the acid fraction into the free acids, esterifying the acids so formed, and subjecting the esters obtained to fractional distillation.

12. A method according to claim 1, including the step of subjecting the acid compounds at any stage of the isolating process to the action of hydrolyzing agents when R is not OH.

13. A method for isolating individual polycyclic hydroxy acid compounds from a mixture of acid compounds obtained according to claim 1, comprising treating said mixture with a non-aqueous solution of a salt-forming alkaline earth metal compound, separating the precipitate formed thereby from the remaining solution and converting the relatively difficultly soluble alkaline earth metal salts precipitated, as well as the relatively readily soluble alkaline earth metal salts isolated from the mother liquor of the precipitate, into the corresponding acids.

14. A method of producing unsaturated polycyclic hydroxy acid compounds of the general formula $C_{19}H_{28}XR$ and the structural formula

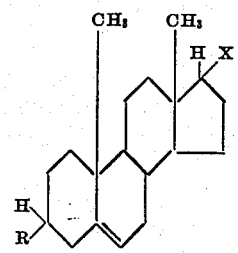

wherein X represents a radical belonging to the group consisting of CH(CH₃).CH₂.CH₂.COOH, CH(CH₃).CH₂.COOH and CH(CH₃).COOH, and R represents a radical belonging to the group consisting of hydroxyl and groups which, upon hydrolysis, are replaced by a hydroxy group, comprising treating a reaction mixture obtained on subjecting sterols containing a double bond in their cyclopentano polyhydro phenanthrene ring system, to the action of oxidizing agents capable of splitting up single carbon to carbon bonds, with an agent capable of separating out the acid fraction, treating said acid fraction with a non-aqueous solution of a salt-forming barium compound, separating the precipitate formed thereby from the remaining solution and converting the relatively difficultly soluble barium salts precipitated, as well as the relatively readily soluble barium salts isolated from the mother liquor of the precipitate, into the corresponding acids.

15. A process of producing unsaturated polycyclic hydroxy acid compounds of the general formula $C_{19}H_{28}XR$ and the structural formula

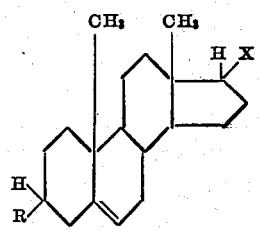

wherein X represents a radical belonging to the group consisting of $CH(CH_3).CH_2.CH_2.COOH$, $CH(CH_3).CH_2.COOH$ and $CH(CH_3).COOH$, and R represents a radical belonging to the group consisting of hydroxyl and groups which, upon hydrolysis, are replaced by a hydroxy group, comprising subjecting nuclearly unsaturated sterols to the action of oxidizing agents capable of splitting up single carbon to carbon bonds, the double bond present in the cyclopentano polyhydro phenanthrene system of said sterols being protected from the action of the oxidizing agent by the addition of a member of the group consisting of halogen and hydrogen halide, subjecting the reaction mixture to the action of an agent capable of separating out the acid fraction of said oxidation mixture and dehalogenating in either order, and treating the separated acid fraction with an agent capable of isolating the polycyclic hydroxy acids present in said acid fraction.

16. A method for the production of 3-hydroxy cholenic acid compounds, comprising using as starting material for the separating and isolating process according to claim 1 the reaction mixture obtained by oxidizing cholesterol compounds with agents capable of splitting up single carbon to carbon bonds.

17. A method for the production of 3-hydroxy norcholenic acid compounds, comprising using as starting material for the separating and isolating process according to claim 1 the reaction mixture obtained by oxidizing sitosterol compounds with agents capable of splitting up single carbon to carbon bonds.

18. A method for the production of 3-hydroxy bisnorcholenic acid compounds, comprising using as starting material for the separating and isolating process according to claim 1 the reaction mixture obtained by oxidizing stigmasterol compounds with agents capable of splitting up single carbon to carbon bonds.

19. A method for the production of 3-hydroxy norcholenic and bisnorcholenic acid compounds, comprising using as starting material for the separating and isolating process according to claim 1 the reaction mixture obtained by oxidizing phytosterol compounds with agents capable of splitting up single carbon to carbon bonds.

20. A new product of the general formula $C_{24}H_{36}O_2RYZ_2$ and the structural formula

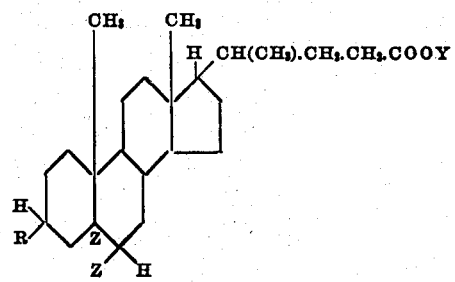

being a 3-hydroxy cholenic acid compound wherein R represents a radical of the group consisting of hydroxyl and groups which, upon hydrolysis, are replaced by the hydroxy group, while Y stands for a member of the group consisting of H, alkyl, aryl, and alkali and alkaline earth metals, and Z, Z represent a member of the group consisting of two halogen atoms, hydrogen and halogen, and a carbon to carbon double bond.

21. A new product of the general formula $C_{23}H_{34}O_2RYZ_2$ and the structural formula

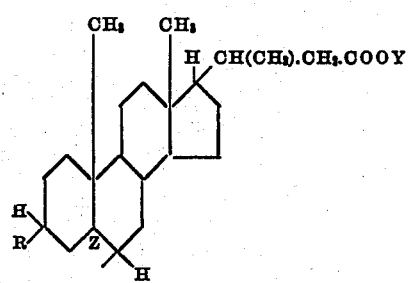

being a 3-hydroxy norcholenic acid compound wherein R represents a radical of the group consisting of hydroxyl and groups which, upon hydrolysis, are replaced by the hydroxy group, while Y stands for a member of the group consisting of H, alkyl, aryl, and alkali and alkaline earth metals, and Z, Z represent a member of the group consisting of two halogen atoms, hydrogen and halogen, and a carbon to carbon double bond.

22. A new product of the general formula $C_{22}H_{32}O_2RYZ_2$ and the structural formula

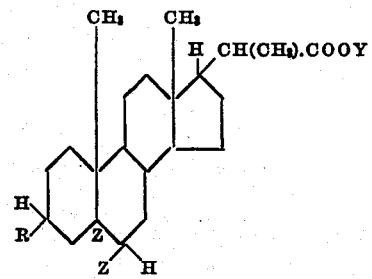

being a 3-hydroxy bisnorcholenic acid compound wherein R represents a radical of the group consisting of hydroxyl and groups which, upon hydrolysis, are replaced by a hydroxy group, while Y stands for a member of the group consisting of H, alkyl, aryl, and alkali and alkaline earth metals, and Z, Z represent a member of the group consisting of two halogen atoms and hydrogen and halogen.

23. A compound of the general structural formula

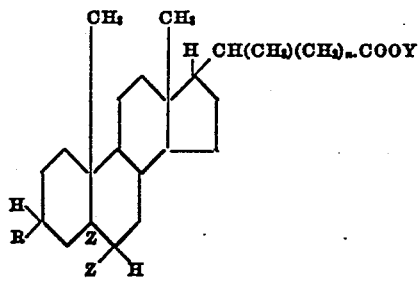

wherein $n$ is a number from 0 to 2, R is a member of the group consisting of hydroxyl and groups which on hydrolysis are replaced by the hydroxy group, Y is a member of the group consisting of H and groups capable of being replaced by H on hydrolysis, and Z, Z represent a member of the group consisting of two halogen atoms and hydrogen and halogen.

LOTHAR STRASSBERGER.
HELMUT JACOBI.

CERTIFICATE OF CORRECTION.

Patent No. 2,180,095. November 14, 1939.

LOTHAR STRASSBERGER, ET AL.

It is hereby certified that error appears in the printed specification of the above numbered patent requiring correction as follows: Page 6, second column, line 40, claim 21, last two positions in the formula, for "$\diagup_H^{\diagdown}$" read $_Z\diagup_H^{\diagdown}$; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.